June 24, 1930.   W. C. RUTH   1,768,214
BALING PRESS FEEDER
Filed June 23, 1928   2 Sheets-Sheet 1
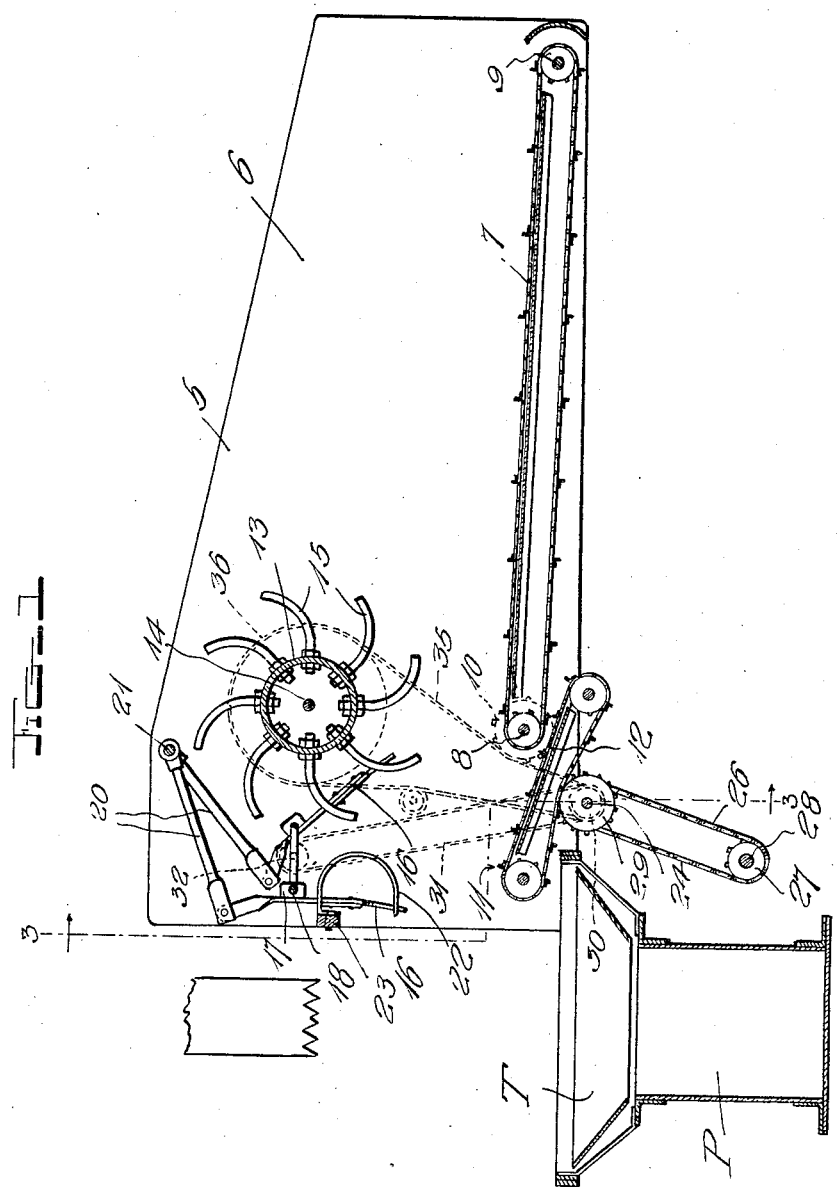
Witness
Inventor
William C. Ruth,
By H. B. Wilson & Co.
Attorneys

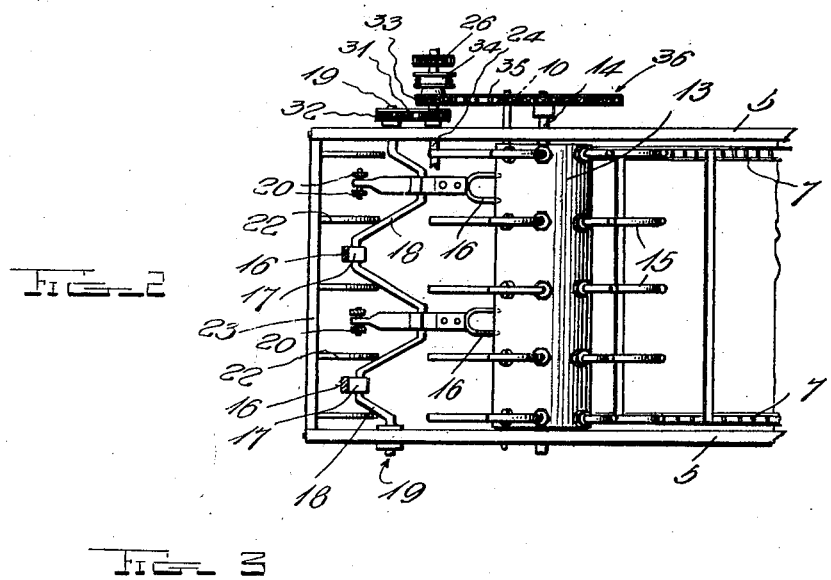

Patented June 24, 1930

1,768,214

UNITED STATES PATENT OFFICE

WILLIAM C. RUTH, OF GAP, PENNSYLVANIA

BALING-PRESS FEEDER

Application filed June 23, 1928. Serial No. 287,753.

The invention relates to feeders designed primarily for use with baling presses, and it aims to provide a new and improved feeder, which while being rather simple and inexpensive, will be efficient and durable and cannot become clogged with hay, straw or other material being handled.

A further aim is to provide a novel construction and relation of parts which insures clearing of all material from the delivery end of the feeder whenever the feeding operation is to be temporarily arrested.

While self-feeders for hay baling presses have been proposed, they encounter difficulty in cutting off the stream of hay being fed to the inlet of the press, when a sufficient quantity has been fed into the bale chamber of the press and a bale is to be completed. A mass of hay, in particular, is difficult to tear apart or separate, but I have found that by using a unique construction and relation of parts I can quickly and effectively get a clean cut in the moving mass or stream of hay and thus have the inlet of the press entirely clear of hay when a sufficient quantity has been fed into the bale chamber and a bale is to be completed. By further using one of the feeders which is continuously operated, to keep hay from wrapping around or clogging one of the feeders which is stopped at intervals, I have produced a machine which will not clog and which is highly efficient.

With the foregoing in view, the invention resides in the novel subject matter hereinafter described and claimed, the preferred embodiments being shown in the accompanying drawings.

Fig. 1 is a longitudinal sectional view through a feeder constructed in accordance with my invention, showing it in operative relation with the inlet throat of a baling press.

Fig. 2 is a fragmentary top plan view of the feeder.

Fig. 3 is an inner end elevation, parts being in section on line 3—3 of Fig. 1.

Fig. 4 is a detail sectional view with parts omitted, showing a modified form of construction.

The drawings above briefly described illustrate the preferred form of construction and while this construction will be herein specifically explained, it is to be understood that within the scope of the invention as claimed, variations may be made.

The numerals 5 denote two laterally spaced vertical side walls which extend laterally from the inlet throat T of a baling press P and may be supported in any desired manner, the upper, outer portions 6 of these walls being preferably disposed in upwardly diverging relation to assist in guiding the material being handled onto a main conveyor 7 which extends longitudinally between the lower portions of said walls. This conveyor is of the slatted apron type composed of cross slats connecting chains which are trained around inner and outer sprockets on shafts 8—9, extending transversely between the walls 5, the shaft 8 being provided with a sprocket wheel 10 for a purpose to appear. The delivery end of the conveyor 7 terminates in inwardly spaced relation with the inner ends of the walls 5, and an auxiliary conveyor 11 is positioned to receive the material from said main conveyor 7, said auxiliary conveyor extending to the inner ends of the walls 5. This auxiliary conveyor is of the endless belt type and embodies chains 12 for a purpose to be described.

A drum 13 extends transversely between the walls 5 over the delivery end of the main conveyor 7 and is provided with a shaft 14 which extends through appropriate bearings carried by said walls. This drum is equipped with a plurality of outwardly projecting curved arms 15 which are spaced apart circumferentially and longitudinally of said drum, said arms normally co-operating with the main conveyor 7 in feeding the material from this conveyor onto the auxiliary conveyor 11. The arms 15 are so curved that the lowermost thereof turn toward the receiving end of the conveyor 7 in hook-like form. Thus, upon stopping of the conveyor 7 and the drum 13, said arms and conveyor alone co-operate in holding the material on said conveyor against further advance.

A plurality of forks 16 are employed to clean all material from the arms 15 as they ascend and to co-operate with the auxiliary conveyor 11 in feeding the material received by this conveyor, into the throat T. Between their ends, the forks 16 are provided with bearings 17 mounted on the cranks 18 of a crank shaft 19 which extends transversely between the walls 5, between their inner ends and the drum 13. Links 20 are pivoted at one end to the upper ends of the forks 16, and at their other ends are pivoted to a transverse rod 21 which is secured to the side walls 5 above the drum 13. Curved cleaning fingers 22 for the forks 16, are mounted on a transverse bar 23 secured to the inner ends of the walls 5. Upon rotation of the crank shaft 19, the forks 16 are operated so that each fork moves downwardly between the inner ends of the arms 15, then moves inwardly toward the delivery end of the auxiliary conveyor 11, then moves upwardly between the cleaning fingers 22 and then moves outwardly toward the drum 13, in readiness to again descend. The forks 16 moving in this manner, effectively clean all material from the arms 15 which would otherwise lodge and pack upon them, and as the forks rise, they are cleaned by the fingers 22. These forks, in moving downwardly and inwardly, co-operate with the auxiliary conveyor 11 in feeding the material received by the latter, into the throat T.

A transverse drive shaft 24 extends under the inner portions of the walls 5 and is mounted in appropriate bearings, said shaft being driven by any desired means such as the chain 26, the sprockets 27 and shaft 28. Shaft 24 carries sprockets 29 meshing with the chains 12 to drive the auxiliary conveyor 11. This shaft also carries a sprocket 30 meshing with a vertical chain 31 which is trained over a sprocket 32 on the crank shaft 19. Hence, as long as shaft 24 is driven, the auxiliary conveyor 11 and the forks 16 will be operated.

Another sprocket 33 is provided on the shaft 24 and may be either connected with or disconnected from the shaft by means of an appropriate clutch 34. This sprocket drives a sprocket chain 35 which is trained around a large sprocket wheel 36 on the shaft 14. Chain 35 meshes also with the sprocket wheel 10 of the main conveyor 7. Hence, as long as the sprocket 33 is driven, the rotatable feeder 13—14—15 will be driven and the main conveyor 7 will also be operated.

The material to be handled is thrown into the outer end of the feeder upon the main conveyor 7 and is inwardly carried by the same. As soon as the material reaches the paths of the arms 15 these arms and the conveyor 7 co-act in feeding a stream or layer of hay onto the auxiliary conveyor 11. The forks 16 not only clean the arms 15 of all material which would otherwise accumulate and pack upon them but cooperate with the auxiliary conveyor 11 in feeding the material on into the throat or inlet T, each fork being cleaned upon its ascent, by the fingers 22. Whenever it is desired to temporarily arrest the feeding of material to the press P, for instance while completing a bale in said press, the clutch 34 is thrown out, thus discontinuing operation of the main conveyor 7 and the rotary feeder 13—14—15 and causing said conveyor 7 and the curved arms 15 to alone co-operate in holding the material against further advance. The shaft 24 continues to rotate however and continues to drive the auxiliary conveyor 11 and the forks 16, with the result that said forks tear all material in advance of the drum 13 from that held by the arms 15 and the main conveyor 7. Consequently, the forks 16 and the auxiliary conveyor 11 effectively clear the inner or delivery end of the feeder of all material, feeding it on into the press at that time and overcoming the possibility of it accidentally dropping through the throat T at a time when such dropping would be undesirable.

In Fig. 4, a reciprocatory and oscillatory pan or chute $11^a$ is shown which forms an auxiliary conveyor and may be used if desired instead of the conveyor 11. A bell crank or the equivalent $11^b$ is connected with the member $11^a$ for moving it upon the supporting bar $11^c$, said part $11^b$ being connected by a pitman $11^d$ with a crank $11^e$ on shaft 19, to be actuated by the latter.

Excellent results are obtainable from the general construction shown and described, and such construction is therefore preferably followed. However, within the scope of the invention as claimed, variations may be made, as above stated.

I claim:—

1. A baling press feeder comprising two laterally spaced side walls whose inner ends are disposed at the inlet throat of a baling press, a main endless conveyor between the lower portions of said walls terminating in inwardly spaced relation with the inner ends thereof, an auxiliary conveyor extending from the delivery end of said main conveyor to said inner ends of said walls, a rotary drum extending transversely between the upper portions of said walls above said delivery end of said main endless conveyor and having projecting arms co-operable with the latter in feeding material onto said auxiliary conveyor, said arms and said main conveyor being adapted to hold the material on said main conveyor against further advance when said main conveyor and said drum are stopped, forks for cleaning said arms as the latter ascend, said forks normally co-operating with said auxiliary conveyor in advancing the material received by the latter but being operable upon stopping of said drum and said main conveyor to tear all material in advance of the drum from the material held by the drum arms and main conveyor, said forks being mounted between the inner extremities of said side walls over said auxiliary conveyor, means for continuously driving said auxiliary conveyor and said forks, and means for driving said main conveyor and said drum and for stopping them at will.

2. A baling press feeder comprising two laterally spaced side walls whose inner ends are disposed at the inlet throat of a baling press, a main endless conveyor between the lower portions of said walls terminating in inwardly spaced relation with the inner ends thereof, an auxiliary conveyor extending from the delivery end of said main conveyor to said inner ends of said walls, a rotary drum extending transversely between the upper portions of said walls above said delivery end of said main endless conveyor and having projecting arms co-operable with the latter in feeding material onto said auxiliary conveyor, said arms and said main conveyor being adapted to hold the material on said main conveyor against further advance when said main conveyor and said drum are stopped, forms for cleaning said arms as the latter ascend, said forks normally co-operating with said auxiliary conveyor in advancing the material received by the latter but being operable upon stopping of said drum and said main conveyor to tear all material in advance of the drum from the material held by the drum arms and main conveyor, said forks being mounted between the inner extremities of said side walls over said auxiliary conveyor, a horizontal bar extending between said inner extremities of said side walls, a plurality of C-shaped cleaners between which said forks move upwardly after they have performed their duty, the upper ends of said cleaners being secured to said bar and the lower ends of said cleaners being inwardly directed toward the baling press throat, means for continuously driving said auxiliary conveyor and said forks, and means for driving said main conveyor and said drum and for stopping them at will.

3. In a feeder, a conveyor, a rotatable drum over the delivery end of said conveyor and having projecting arms so curved that the lowermost thereof turn toward the receiving end of said conveyor, said arms being normally co-operable with said conveyor in advancing the material and upon stopping of said conveyor and drum being adapted to co-act with said conveyor in holding the material on the latter against further advance, forks in advance of said drum mounted for movement downwardly between the inner ends of said arms, then toward the outer ends of said arms, then upwardly and then again toward the inner ends of said arms, whereby said forks will normally clear all material from the ascending arms and upon stopping of the conveyor and drum will tear all material in advance of said drum from that jointly held by the arms and the conveyor, means for continuously driving said forks, and means for driving said conveyor and said drum or for stopping them at will.

4. A feeder comprising two laterally spaced side walls, a main conveyor between the lower portions of said walls terminating in inwardly spaced relation with the inner ends thereof, an auxiliary conveyor extending from the delivery end of said main conveyor to said inner ends of said walls, a rotary drum extending transversely between the upper portions of said walls above said delivery end of said main conveyor and having projecting arms co-operable with the latter in feeding material onto said auxiliary conveyor, said arms being so curved that the lowermost thereof turn toward the receiving end of said main conveyor, whereby said arms are adapted to co-operate with said main conveyor in holding the material on the latter against further advance when said main conveyor and said drum are stopped, forks for cleaning said arms as the latter ascend, said forks normally co-operating with said auxiliary conveyor in advancing the material received by the latter but being operable upon stopping of said drum and said main conveyor to tear all material in advance of the drum from the material held by the drum arms and main conveyor, means for continuously driving said auxiliary conveyor and said forks, and means for driving said main conveyor and said drum and for stopping them at will.

5. In a feeder, a rotatable member having projecting arms to engage the material to be fed, cleaning members at one side of said rotatable member, and mounting and driving means for said cleaning members for moving them downwardly between the inner ends of said arms, then outwardly beyond the outer ends of said arms, then upwardly and then inwardly toward the inner ends of the arms.

In testimony whereof I have hereunto affixed my signature.

WILLIAM C. RUTH.